US007004594B2

(12) United States Patent
Shimizu et al.

(10) Patent No.: US 7,004,594 B2
(45) Date of Patent: Feb. 28, 2006

(54) MIRROR ANGLE CONTROL APPARATUS AND POWER MIRROR SYSTEM HAVING THE SAME

(75) Inventors: Masaaki Shimizu, Toyohashi (JP); Kiyohide Terada, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 154 days.

(21) Appl. No.: 10/718,669

(22) Filed: Nov. 24, 2003

(65) Prior Publication Data

US 2004/0105180 A1 Jun. 3, 2004

(30) Foreign Application Priority Data

Dec. 3, 2002 (JP) ............................ 2002-351519

(51) Int. Cl.
*G02B 7/182* (2006.01)
*B60R 1/06* (2006.01)

(52) U.S. Cl. ....................... 359/874; 359/876; 359/877

(58) Field of Classification Search ................ 359/872, 359/873, 874, 876, 877
See application file for complete search history.

(56) References Cited

U.S. PATENT DOCUMENTS 3,609,014 A * 9/1971 Kurz, Jr. ..................... 359/874
3,972,597 A * 8/1976 Repay et al. ............... 359/874
4,056,253 A * 11/1977 Repay et al. ............... 248/479
4,153,342 A * 5/1979 Mittelhauser ............... 359/874
4,171,873 A * 10/1979 Repay et al. ............... 359/874
4,202,603 A * 5/1980 Miyauchi .................... 359/874
4,273,417 A * 6/1981 Mittelhauser ............... 359/873
4,324,454 A * 4/1982 Kumai ....................... 359/873
6,612,707 B1 * 9/2003 Kaspar et al. ............. 359/873

FOREIGN PATENT DOCUMENTS

| | | |
|---|---|---|
| DE | 2810888 | * 9/1978 |
| DE | 4312847 | * 10/1994 |
| JP | U-6-32194 | 4/1994 |
| JP | U-6-49199 | 7/1994 |

* cited by examiner

*Primary Examiner*—Ricky D. Shafer
(74) *Attorney, Agent, or Firm*—Posz Law Group, PLC

(57) ABSTRACT

First and second reciprocable members are arranged between a motor and a mirror and are selectively reciprocated by rotational force conducted from the motor to tilt the mirror. When the motor is rotated in a first rotational direction, the second reciprocable member is held stationary, and the first reciprocable member is reciprocated to tilt the mirror in a vertical direction. When the motor is rotated in a second rotational direction, which is opposite from the first rotational direction of the motor, the first reciprocable member is held stationary, and the second reciprocable member is reciprocated to tilt the mirror in a horizontal direction.

6 Claims, 7 Drawing Sheets

MIRROR ANGLE CONTROL APPARATUS AND POWER MIRROR SYSTEM HAVING THE SAME

CROSS REFERENCE TO RELATED APPLICATION

This application is based on and incorporates herein by reference Japanese Patent Application No. 2002-351519 filed on Dec. 3, 2002.

BACKGROUND OF THE INVENTION

1. Field of the Invention

The present invention relates to a mirror angle control apparatus and a power mirror system having the same.

2. Description of Related Art

One type of power mirror system (also referred to as a power side mirror system or simply referred to as a power side mirror) arranged at a door of a vehicle has a mirror angle control apparatus that tilts a mirror (i.e., a mirror plate) in a vertical direction and also in a horizontal direction.

The mirror angle control apparatus includes a vertical angle adjuster and a horizontal angle adjuster. The vertical angle adjuster tilts the mirror in the vertical direction. The horizontal angle adjuster tilts the mirror in the horizontal direction. This type of mirror angle control apparatus is disclosed in, for example, Japanese Unexamined Utility Model Publication No. 6-49199 and Japanese Unexamined Utility Model Publication No. 6-32194.

In the above mirror angle control apparatus, one motor is provided in the vertical angle adjuster, and another motor is provided in the horizontal angle adjuster. The mirror is tilted in the vertical direction and in the horizontal direction by separately controlling the motors.

Thus, in the above mirror angle control apparatus, the two motors are provided in the vertical angle adjuster and the horizontal angle adjuster, respectively. This arrangement creates difficulties in size reduction and weight reduction of the mirror angle control apparatus and thus of the power mirror system. Furthermore, this arrangement causes an increase in the number of the components and also an increase in manufacturing costs.

SUMMARY OF THE INVENTION

The present invention addresses the above disadvantages. Thus, it is an objective of the present invention to provide a mirror angle control apparatus, which allows minimization of a size, weight and manufacturing costs of the mirror angle control apparatus. It is another objective of the present invention to provide a power mirror system that has such a mirror angle control apparatus.

To achieve the objectives of the present invention, there is provided a mirror angle control apparatus for a power mirror system that includes a mirror. The mirror angle control apparatus includes a single electric motor and first and second reciprocable members. The first and second reciprocable members are arranged between the motor and the mirror and are selectively reciprocated by rotational force conducted from the motor to tilt the mirror. When the motor is rotated in a first rotational direction, the second reciprocable member is held stationary, and the first reciprocable member is reciprocated to tilt the mirror in a vertical direction. When the motor is rotated in a second rotational direction, which is opposite from the first rotational direction of the motor, the first reciprocable member is held stationary, and the second reciprocable member is reciprocated to tilt the mirror in a horizontal direction. There is also provided a power mirror system that includes a mirror and the above mirror angle control apparatus.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
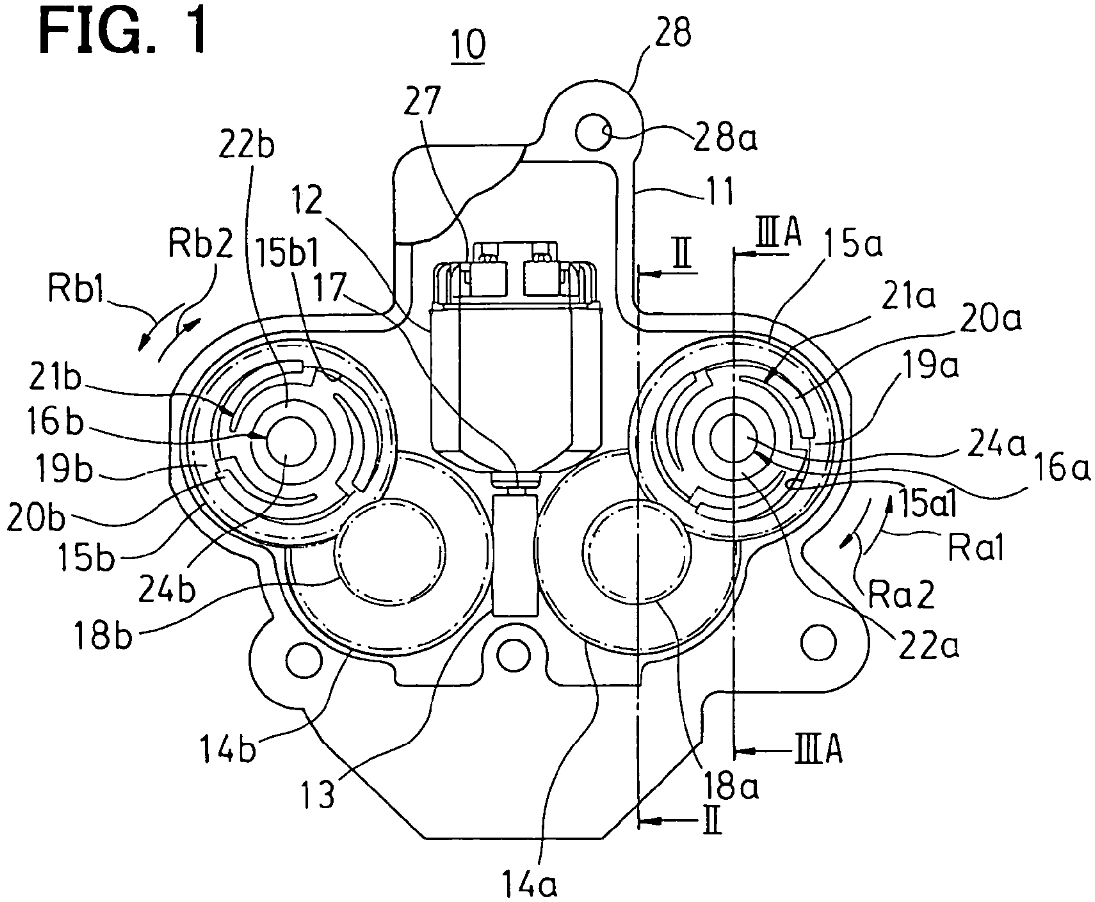
FIG. 1 is a fragmented descriptive view showing an internal structure of a mirror angle control apparatus according to an embodiment of the present invention while partially removing part of a casing of the mirror angle control apparatus and fully removing top covers of secondary gears for the sake of clarity.

With reference to FIG. 1, a mirror angle control apparatus 10 according to an embodiment of the present invention is used in, for example, a power side mirror system of a vehicle provided in a door to adjust a tilt angle of a mirror of the power side mirror system.

The mirror angle control apparatus 10 includes a casing 11, a motor 12, a worm gear 13, two primary gears (i.e., first and second primary gears) 14*a*, 14*b*, two secondary gears (i.e., first and second secondary gears) 15*a*, 15*b* and two reciprocal members (i.e., first and second reciprocable members) 16*a*, 16*b*.

The motor 12 is secured in the casing 11, and the worm gear 13 is secured around a rotatable shaft 17 of the motor 12. The primary gears 14*a*, 14*b* are disposed on the opposite sides (first and second sides) of the worm gear 13 and are rotatably secured to the casing 11. The primary gears 14*a*, 14*b* are meshed with the worm gear 13.

Figure 2:
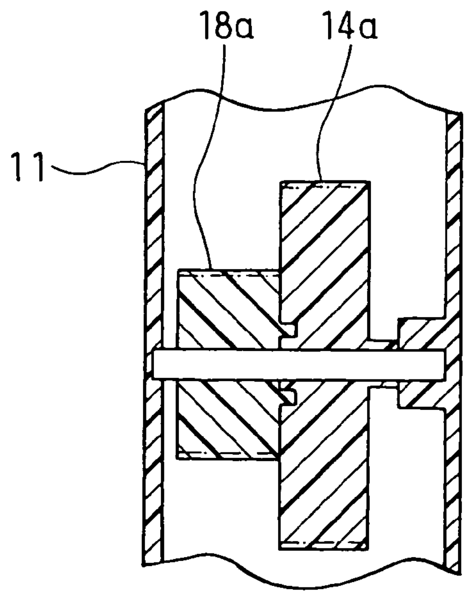
FIG. 2 is a partial cross sectional view along line II—II in FIG. 1.

As shown in FIG. 2, a first intermediate gear 18*a* is coaxially secured to the center of the primary gear 14*a* and is meshed with the corresponding secondary gear 15*a*. A gear diameter of the intermediate gear 18*a* is smaller than a gear diameter of the primary gear 14*a*.

Similar to the primary gear 14*a*, a second intermediate gear 18*b* is coaxially secured to the center of the primary gear 14*b*and is meshed with the corresponding secondary gear 15*b*.

Each secondary gear 15*a*, 15*b* includes a one-way clutch mechanism, which conducts rotational force of the secondary gear 15*a*, 15*b* only in one way and prevents conduction of the rotational force in the opposite way.

More specifically, three driving-side engaging portions (in a form of an engaging wall portion in the present embodiment) 19*a* are formed in an inner peripheral wall of a generally circular recess 15*a*1 formed in the secondary gear 15*a*. A first clutch plate 21*a*, which has three driven-side engaging portions (in a form of an engaging projection in the present embodiment) 20*a*, is received in the recess 15*a*1 of the secondary gear 15*a*.

Similar to the secondary gear 15*a*, three driving-side engaging portions (in a form of an engaging wall portion in the present embodiment) 19*b* are formed in an inner peripheral wall of a generally circular recess 15*b*1 formed in the secondary gear 15*b*. A second clutch plate 21*b*, which has three driven-side engaging portions (in a form of an engaging projection in the present embodiment) 20*b*, is received in the recess 15*b*1 of the secondary gear 15*b*.

The primary gear 14*a*, the secondary gear 15*a* and the intermediate gear 18*a* form a first speed reducing gear arrangement, which reduces a rotational speed transmitted from the worm gear 13 to the first one-way clutch mechanism 19*a*, 21*a* in comparison to a rotational speed of the worm gear 13. Furthermore, the primary gear 14*b*, the secondary gear 15*b* and the intermediate gear 18*b* form a second speed reducing gear arrangement, which reduces a rotational speed transmitted from the worm gear 13 to the second one-way clutch mechanism 19*b*, 21*b* in comparison to a rotational speed of the worm gear 13.

With reference to FIG. 1, when the secondary gear 15*a* is rotated in a direction of arrow Ra1 (first rotational direction), the driving-side engaging portions 19*a* engage the driven-side engaging portions 20*a*. Thus, the clutch plate 21*a* is rotated together with the secondary gear 15*a*. On the other hand, when the secondary gear 15*a* is rotated in a direction of arrow Ra2 (second rotational direction), which is opposite to the direction of arrow Ra1, the driving-side engaging portions 19*a* are disengaged from the driven-side engaging portions 20*a* or simply do not engage the driven-side engaging portions 20*a*, and thus the secondary gear 15*a* is raced, i.e., is rotated relative to the clutch plate 21*a* without driving the clutch plate 21*a*.

Similarly, when the secondary gear 15*b* is rotated in a direction of arrow Rb1 (first rotational direction), the driving-side engaging portions 19*b* engage the driven-side engaging portions 20*b*. Thus, the clutch plate 21*b* is rotated together with the secondary gear 15*b*. On the other hand, when the secondary gear 15*b* is rotated in a direction of arrow Rb2 (second rotational direction), which is opposite from the direction of arrow Rb1, the driving-side engaging portions 19*b* are disengaged from the driven-side engaging portions 20*b* or simply do not engage the driven-side engaging portions 20*b*, and thus the secondary gear 15*b* is raced, i.e., is rotated relative to the clutch plate 21*b* without driving the clutch plate 21*b*.

Figure 3A:
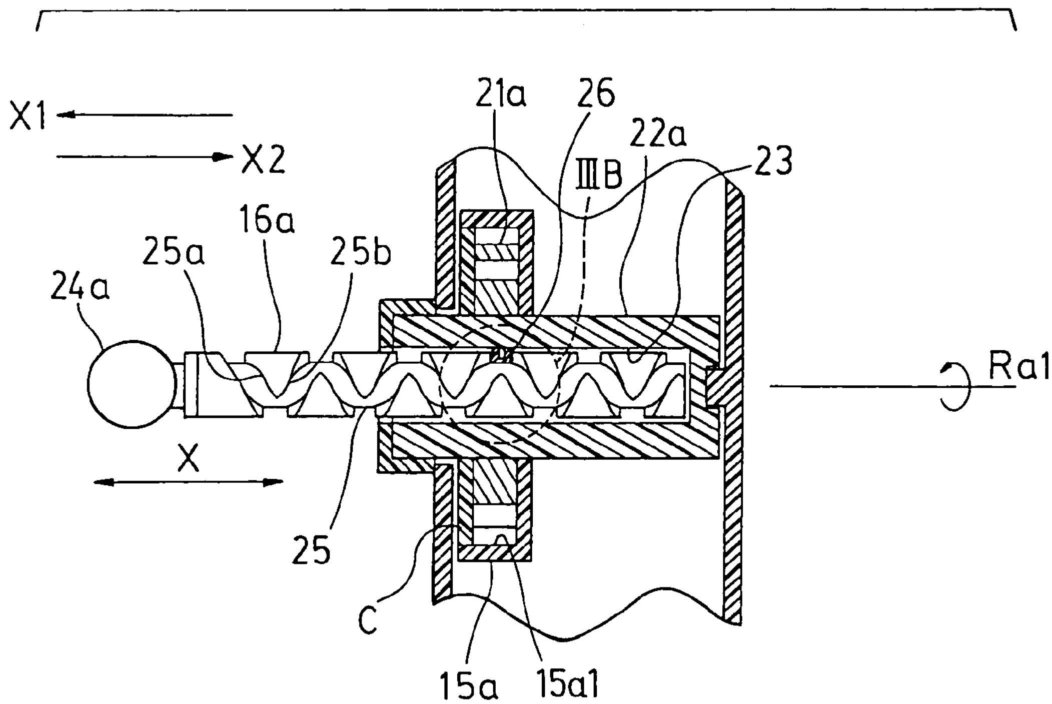
FIG. 3A is a partial cross sectional view along line III–IIIA in FIG. 1.
Figure 3B:
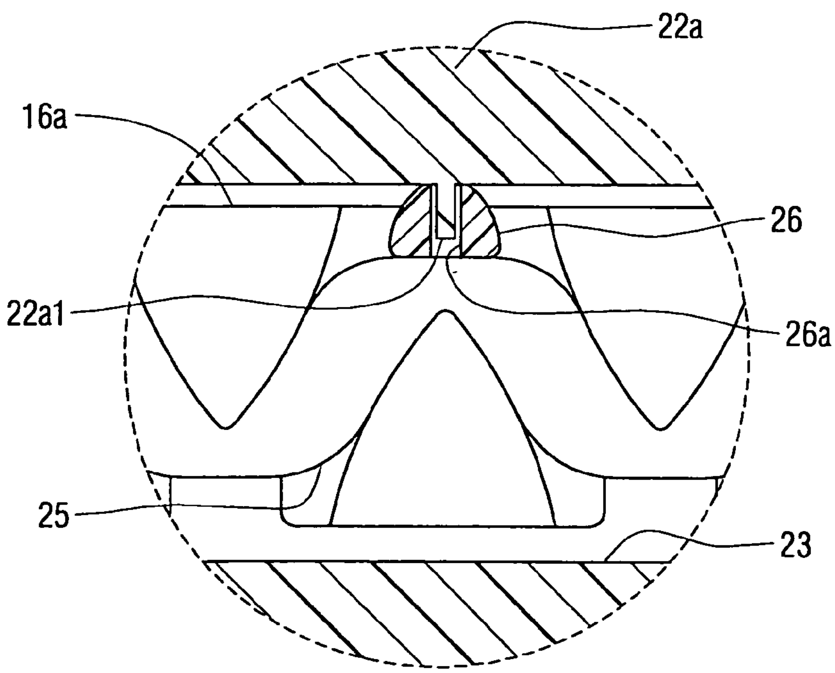
FIG. 3B is a partial enlarged view of a region enclosed in a circle IIIB in FIG. 3A.
Figure 6:
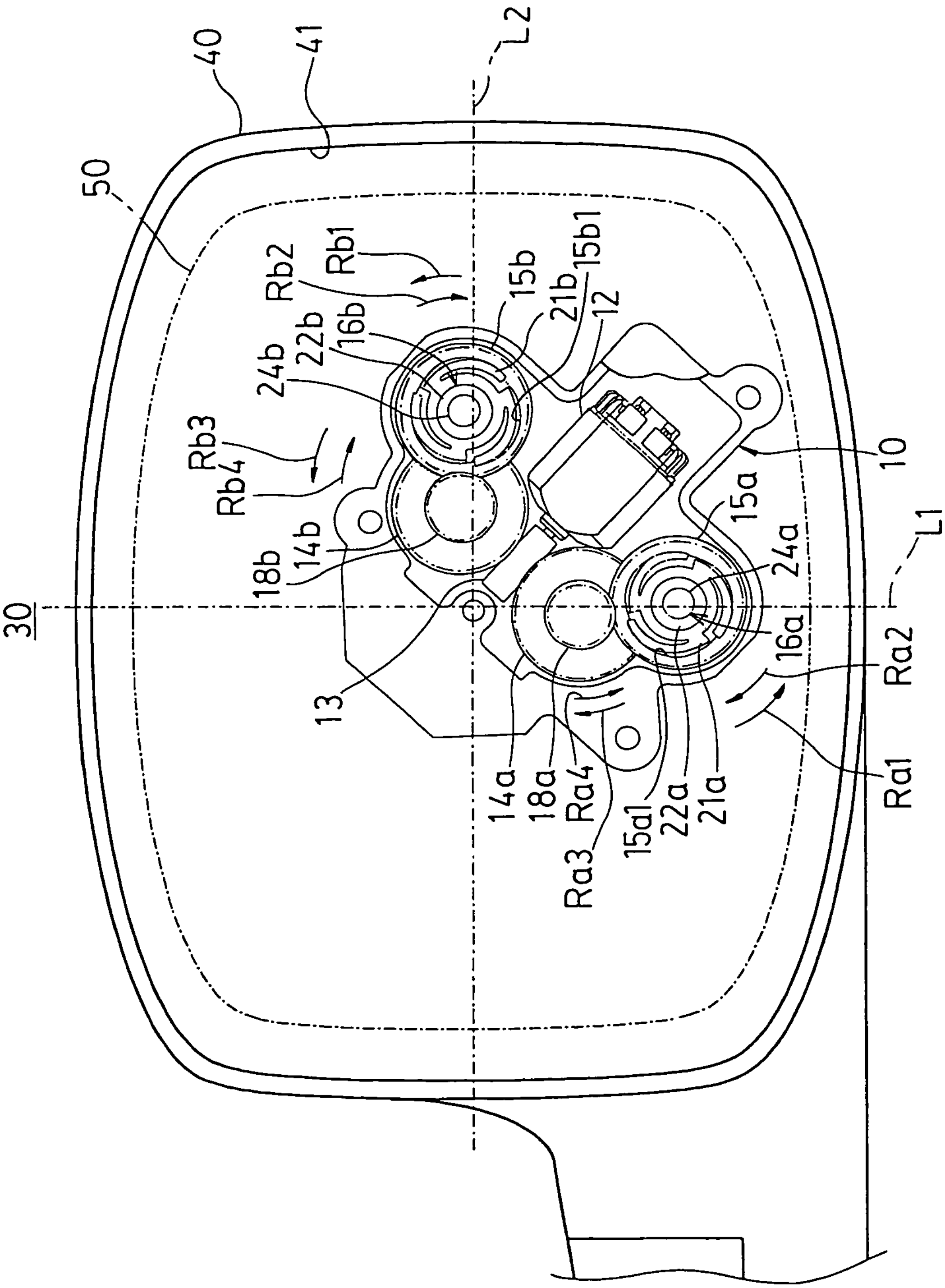
FIG. 6 is a descriptive view showing a structure of a power mirror system according to the embodiment.

As shown in FIG. 3A, in the mirror angle control apparatus 10 of the present embodiment, a top cover C covers an end opening of the recess 15*a*1 of the secondary gear 15*a*, in which the clutch plate 21*a* is received. In FIGS. 1 and 6, the top cover C is removed from the secondary gear 15*a* for the sake of clarity. The secondary gear 15*b* is constructed in a manner similar to the secondary gear 15*a* and thus will not be described in great detail.

As shown in FIG. 3A, a first cylindrical slide support (serving as a first rotatable member of the present invention) 22*a* is secured to the clutch plate 21*a* to rotate integrally with the clutch plate 21*a*.

A cylindrical blind hole 23 extends in the slide support 22*a* in a longitudinal direction of the slide support 22*a* and is opened in one end (left end in FIG. 3A) of the slide support 22*a*. The reciprocable member 16*a*, which is made of an elongated cylindrical body, is received in the blind hole 23. The reciprocable member 16*a* is reciprocable relative to the slide support 22*a* in a direction of arrow X in FIG. 3A and has a spherical pivot 24*a*, which is integrated in a distal end of the reciprocable member 16*a*. A first endless helical groove 25 is formed to provide a Napier screw in an outer peripheral surface of the reciprocable member 16*a*. The endless helical groove 25 includes two helical groove sections 25*a*, 25*b*, which extend in opposite helical directions, respectively, and are connected one another at opposite ends of the reciprocable member 16*a* to form an endless path.

Figure 4:
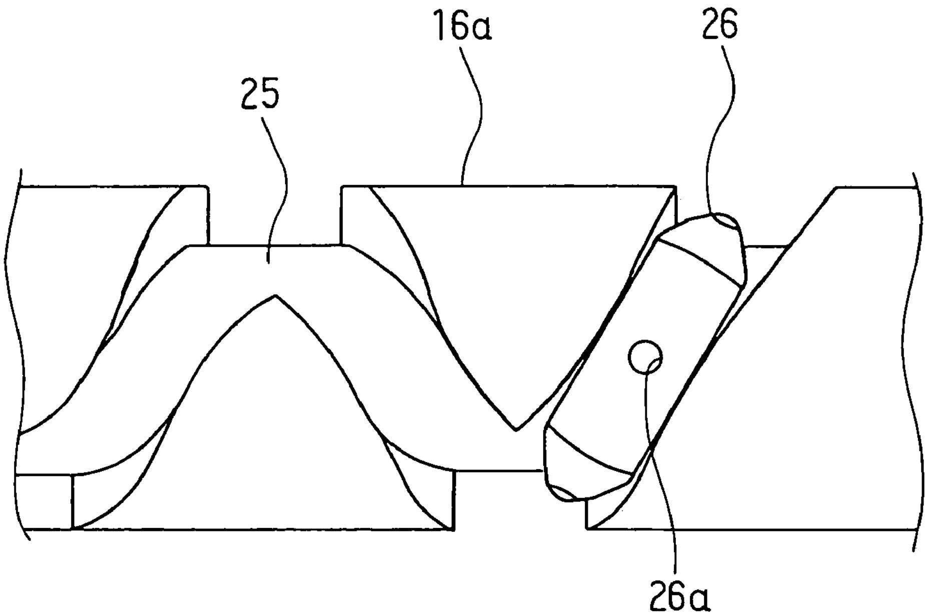
FIG. 4 is a descriptive view showing engagement of a slide piece with an endless helical groove of a reciprocable member while removing a slide support from the reciprocable member.
Figure 5A:
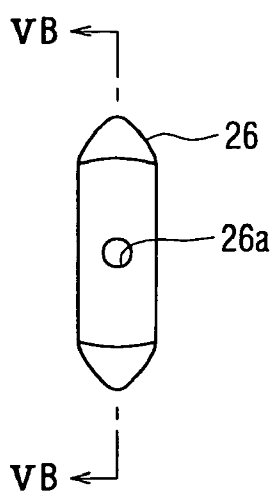
FIG. 5A is a plan view of the slide piece.
Figure 5B:
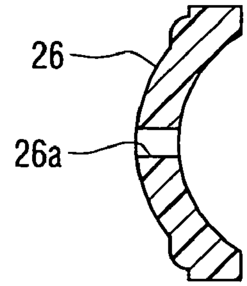
FIG. 5B is a cross sectional view of the slide piece along line VB—VB in FIG. 5A.

A first slide piece 26 is provided in the blind hole 23 of the slide support 22*a* and engages the endless helical groove 25 of the reciprocable member 16*a*. Through the engagement with the endless groove 25, the slide piece 26 drives the reciprocable member 16*a* such that the reciprocable member 16*a* is reciprocated relative to the slide support 22*a* when the slide support 22*a* is rotated. More specifically, as shown in FIGS. 3B to 5B, the slide piece 26 has a through hole 26*a* that penetrates through the slide piece 26 at a center of the slide piece 26. A pin 22*a*1 extends from the inner peripheral wall of the blind hole 23 of the slide support 22*a* in a direction generally perpendicular to a reciprocating direction of the reciprocable member 16*a* and is received in the through hole 26*a* of the slide piece 26. The slide piece 26 is rotatable about a central axis (serving as a rotational axis of the slide piece 26) of the pin 22*a*1. Axial ends of the slide piece 26 are tapered, and an inner surface of the slide piece 26, which is engaged with an arcuate bottom surface of the endless helical groove 25, is arcuately curved to follow the curved surface of the endless helical groove 25, as shown in FIGS. 4–5B. A curvature of the inner surface of the slide piece 26 is smaller than a curvature of the bottom surface of the endless helical groove 25, so that only a center portion of the inner surface of the slide piece 26 slidably engages the arcuate bottom surface of the endless helical groove 25. With the above arrangement of the slide piece 26, when the slide piece 26 moves from one of the helical groove sections 25*a*, 25*b* to the other one of the helical groove sections 25*a*, 25*b*, the slide piece 26 can change its moving direction.

Furthermore, with the provision of the one-way clutch mechanism in the second gear 15*a* and the provision of the slide piece 26 in the slide support 22*a*, the reciprocable member 16*a*is reciprocated in the reciprocating direction that is parallel to the rotational axis of the slide support 22*a* when the secondary gear 15*a* is rotated in the direction of arrow Ra1.

Similar to the slide support 22*a*, a cylindrical blind hole (not shown) extends in a second slide support 22*b* (serving as a second rotatable member of the present invention) in a longitudinal direction of the slide support 22*b*. A second reciprocable member 16*b*, which is made of an elongated cylindrical body, is received in the cylindrical blind hole of the slide support 22*b*, which is similar to the cylindrical blind hole 23 of the slide support 22*a*.

The reciprocable member 16*b* has a shape similar to the reciprocable member 16*a*. Furthermore, the reciprocable member 16*b* has a spherical pivot 24*b*, which is integrated in a distal end of the reciprocable member 16*b*. An endless helical groove similar to the endless helical groove 25 is formed in an outer peripheral surface of the reciprocable member 16*b*. The endless helical groove includes two helical groove sections, which are similar to the helical grooves 25*a*, 25*b*. Like the helical grooves 25*a*, 25*b*, the two helical groove sections of the endless helical groove extend in opposite helical directions, respectively, and are connected one another at opposite ends of the reciprocable member 16*a* to form an endless path.

A slide piece (not shown), which has a shape similar to the slide piece 26, is provided in a blind hole of the slide support 22*b* and engages the endless helical groove of the reciprocable member 16*b* to move along the endless path of the endless helical groove.

Similar to the reciprocable member 16*a*, the reciprocable member 16*b* reciprocates in a reciprocating direction, which is parallel to the rotational axis of the slide support 22*b*, when the secondary gear 15*b* is rotated in the direction of arrow Rb1.

A power supply terminal (not shown), which is connected to a power application terminal 27 of the motor 12, is formed in the casing 11. When electric power is supplied from an external power source to the power supply terminal (not shown) of the casing 11, the motor 12 is rotated.

When the electric power is supplied from the external power source to the motor 12, the rotatable shaft 17 of the motor 12 is rotated at a constant rotational speed. Furthermore, upon switching of polarities of the external power source, the rotational direction of the rotatable shaft 17 is changed from one direction to the other direction, and vice versa.

With reference to FIG. 1, securing portions 28 are formed in an outer surface of the casing 11. Each securing portion 28 includes a through hole 28*a*, which penetrates through the securing portion 28 and has an inner diameter that allows insertion of, for example, a screw (not shown) in the through hole 28*a*. Through the securing portions 28, the mirror angle control apparatus 10 is secured in a power mirror system 30, which will be described in greater detail below.

The power mirror system 30, which includes the mirror angle control apparatus 10, will be described with reference to FIGS. 6 and 7. In order to facilitate understanding of an internal structure of the power mirror system 30, a mirror (mirror plate) 50, which is described in greater detail, is indicated by a dot-dash line in FIG. 6.

Figure 7:
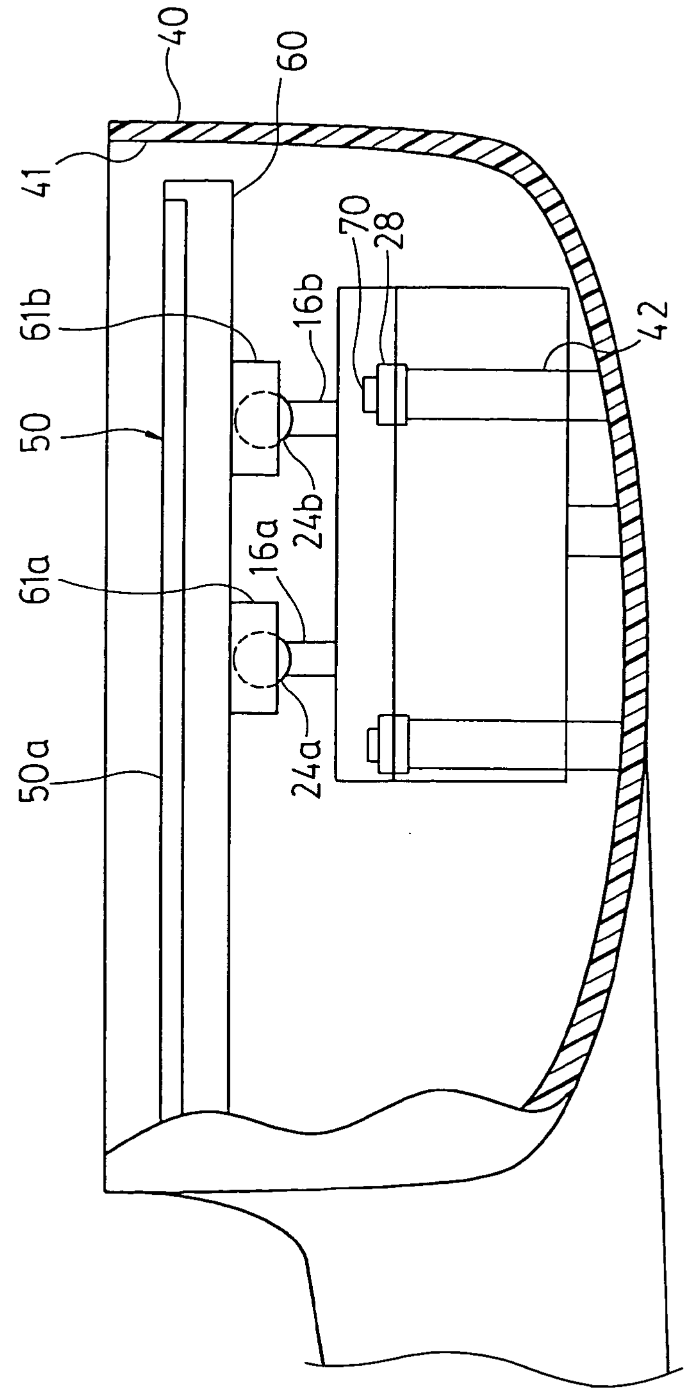
FIG. 7 is a partial fragmentary cross sectional view of the power mirror system of FIG.6 seen from a bottom side of the power mirror system.

The power mirror system 30 shown in FIGS. 6 and 7 is arranged in, for example, a door or any other appropriate part of a vehicle to provide a rear view of the vehicle to a vehicle driver.

The power mirror system 30 of the present embodiment includes the mirror angle control apparatus 10, a mirror housing 40, the mirror 50 and a mirror holder 60 (FIG. 7).

The mirror housing 40 is integrally connected to the vehicle door and is formed as a recessed body or a cup shaped body, which has an opening 41 that is directed to a rear end of the vehicle. As shown in FIG. 7, a plurality of bosses 42 is formed in an interior base of the mirror housing 40. Each securing portion 28 of the mirror angle control apparatus 10 is secured to a corresponding one of the bosses 42 through a securing element 70, so that the mirror angle control apparatus 10 is integrally secured to the mirror housing 40.

The mirror 50 is secured to the mirror holder 60 such that the mirror 50 generally covers the opening 41 of the mirror housing 40. A vehicle rear side surface 50*a* of the mirror 50 is formed as a specular surface, i.e., a mirror surface to allow the driver to have a rear side view.

On an opposite side of the mirror holder 60, which is opposite from the mirror 50, two pivot holders 61*a*, 61*b* are provided, as shown in FIG. 7. The pivots 24*a*, 24*b* are fitted into the pivot holders 61*a*, 61*b*, respectively.

The pivot 24*a* and the pivot holder 61*a* form a first universal joint assembly, and the pivot 24*b* and the pivot holder 61*b* form a second universal joint assembly. With this arrangement, the reciprocable members 16*a*, 16*b* are integrated with the mirror holder 60 in a manner that allows swing movement of the mirror holder 60.

With reference to FIG. 6, when the mirror angle control apparatus 10 is integrally secured to the mirror housing 40, the pivot 24*a* (more specifically, the central axis of the first reciprocable member 16*a*) of the mirror angle control apparatus 10 is located at a vertically lower side of the mirror 50 along a central vertical axis (vertical imaginary line) L1 of the mirror 50, which extends vertically through the center of the mirror 50. Furthermore, the pivot 24*b* (more specifically, the central axis of the second reciprocable member 16*b*) of the mirror angle control apparatus 10 is located at a horizontally outer side of the mirror 50 along a central horizontal axis (horizontal imaginary line) L2 of the mirror 50, which extends horizontally through the center of the mirror 50. However, the pivots 24*a*, 24*b* are not necessarily arranged in the above manner. That is, as long as the central axis of the first reciprocable member 16*a* intersects the central vertical axis L1 of the mirror 50 at a location spaced away from the center of the mirror 50, the pivot 24*a* can be placed any position (e.g., a position above the center of the mirror 50 in FIG. 6). Similarly, as long as the central axis of the second reciprocable member 16*b* intersects the central horizontal axis L2 of the mirror 50 at a location spaced away from the center of the mirror 50, the pivot 24*b* can be placed any position (e.g., a position on the left side of the center of the mirror 50 in FIG. 6).

The power mirror system 30 is manipulated trough a power mirror control switch arrangement (not shown), which is provided at a driver seat side in a passenger compartment of the vehicle.

The power mirror control switch arrangement includes a vertical angle control switch and a horizontal angle control switch (both not shown).

When the vertical angle control switch is turned on, the motor 12 of the mirror angle control apparatus 10 shown in FIG. 6 is rotated in a normal direction (first rotational direction). Furthermore, when the horizontal angle control switch is turned on, the motor 12 is rotated in a reverse direction (second rotational direction).

In the above embodiment, the worm gear 13, the speed reducing gear arrangements 14*a*, 14*b*, 15*a*, 15*b*, 18*a*, 18*b* and the one-way clutch mechanisms 19*a*, 19*b*, 21*a*, 21*b* constitute a switchable type transmission mechanism that is arranged between the motor 12 and the first and second slide supports 22*a*, 22*b*.

It should be noted that the power mirror system 30 can be modified as follows. That is, when a transmission lever of the vehicle is shifted to a reverse position, the motor 12 of the mirror angle control apparatus 10 may be rotated in the normal direction to substantially tilt the mirror 50 in a downward direction of the vehicle.

Furthermore, a position sensor (not shown) may be provided to sense a position of each reciprocable member 16*a*, 16*b*, and the motor 12 may be operated based on a position signal outputted from the position sensor.

Next, operation of the power mirror system 30 will be described.

When the vertical angle control switch of the power mirror system is pressed, i.e., is turned on, electric power is supplied from the external power source (not shown) to the motor 12 shown in FIG. 6, so that the motor 12 is rotated in the normal direction. Thus, the worm gear 13 is rotated in the normal direction. Also, the primary gears 14*a* and the intermediate gear 18*a* are rotated in the direction of arrow Ra3, and the primary gear 14*b* and the intermediate gear 18*b* are rotated in the direction of arrow Rb3.

When the primary gear 14*a* and the intermediate gear 18*a* are rotated in the direction of arrow Ra3, the secondary gear 15*a* is rotated in the direction of arrow Ra1. Thus, the driving-side engaging portions 19*a* engage the driven-side engaging portions 20*a*, and the secondary gear 15*a* and the clutch plate 21*a* are rotated in the direction of arrow Ra1.

When the primary gear 14*b* and the intermediate gear 18*b* are rotated in the direction of Rb3, the secondary gear 15*b* is rotated in the direction of arrow Rb2. Thus, engagement between the driving-side engaging portions 19*b* and the driven-side engaging portions 20*b* is released, and the secondary gear 15*b* is raced, i.e., is rotated relative to the clutch plate 21*b*.

Thus, when the secondary gear 15*b* is rotated relative to the clutch plate 21*b*, the clutch plate 21*b* is held stationary. As a result, the reciprocable member 16*b* does not reciprocate, and the mirror 50 does not tilt in the horizontal direction (left-right direction).

On the other hand, when the clutch plate 21*a* is rotated in the direction of arrow Ra1, the slide support 22*a* is rotated together with the clutch plate 21*a*. When the slide support 22*a*is rotated, the slide piece 26 is moved along one of the helical groove sections 25*a*, 25*b* of the endless helical groove 25 of the reciprocable member 16*a*. Thus, the reciprocable member 16*a* is moved forward or backward in the direction of arrow X in FIG. 3A.

When the slide piece 26 is in the helical groove section 25*a*, and the slide support 22*a* is rotated in the direction of arrow Ra1, the reciprocable member 16*a* is moved forward in a direction of arrow X1 in FIG. 3A.

When the reciprocable member 16*a* is moved forward in the direction of arrow X1, the vertically lower side of the mirror 50 shown in FIG. 6 is pushed by the pivot 24*a*. Thus, the mirror 50 is tilted vertically upward.

Then, when the vertical angle control switch is kept pressed, i.e., is kept turned on, the slide support 22*a* is kept rotated in the direction of arrow Ra1. Thus, the slide piece 26 is moved from the helical groove section 25*a* to the helical groove section 25*b*, so that the reciprocable member 16*a*, which has been moved forward in the direction of arrow X1, is now moved backward in a direction of arrow X2 shown in FIG. 3A.

When the reciprocable member 16*a* is moved backward, the vertically lower side of the mirror 50 shown in FIG. 6 is pulled by the pivot 24*a*. Thus, the mirror 50 is tilted vertically downward.

As described above, in the power mirror system 30 of the present embodiment, when the vertical angle control switch is kept turned on, the mirror 50 is kept tilted vertically, i.e., is kept swung vertically. Thus, the operator can turn off the vertical angle control switch when the mirror 50 is tilted to a desired vertical angle, so that the mirror 50 is adjusted to the desired vertical tilt angle.

When the horizontal angle control switch of the power mirror system 30 is pressed, i.e., is turned on, electric power is supplied from the external power source (not shown) to the motor 12 shown in FIG. 6, so that the motor 12 is rotated in the reverse direction, which is opposite from the normal direction that is the rotational direction of the motor 12 at the time of pressing the vertical angle control switch. Thus, the worm gear 13 is rotated in the reverse direction. Also, the primary gears 14*a* and the intermediate gear 18*a* are rotated in the direction of arrow Ra4, and the primary gear 14*b* and the intermediate gear 18*b* are rotated in the direction of arrow Rb4.

When the primary gear 14*b* and the intermediate gear 18*b* are rotated in the direction of arrow Rb4, the secondary gear 15*b* is rotated in the direction of arrow Rb1. Thus, the driving-side engaging portions 19*b* engage the driven-side engaging portions 20*b*, and the secondary gear 15*b* and the clutch plate 21*b* are rotated in the direction of arrow Rb1.

When the primary gear 14*a* and the intermediate gear 18*a* are rotated in the direction of Ra4, the secondary gear 15*a* is rotated in the direction of arrow Ra2. Thus, engagement between the driving-side engaging portions 19*a* and the driven-side engaging portions 20*a* is released, and the secondary gear 15*a* is raced, i.e., is rotated relative to the clutch plate 21*a*.

Thus, when the secondary gear 15*a* is rotated relative to the clutch plate 21*a*, the clutch plate 21*a* is held stationary. As a result, the reciprocable member 16*a* does not reciprocate, and the mirror 50 does not tilt in the vertical direction (top-bottom direction).

On the other hand, when the clutch plate 21*b* is rotated in the direction of arrow Rb1, the slide support 22*b* is rotated together with the clutch plate 21*b*. In this way, the reciprocable member 16*b* is moved forward or backward.

When the slide support 22*b* is rotated in the direction of arrow Rb1, and the reciprocable member 16*b* is moved forward, the horizontally outer side of the mirror 50 is pushed by the pivot 24*b*. Thus, the mirror 50 is tilted horizontally inward i.e., is tilted horizontally toward the center of the vehicle.

Then, when the horizontal angle control switch is kept pressed, i.e., is kept turned on, the reciprocable member 16*b* is moved backward. Then, the horizontally outer side of the mirror 50 is pulled by the pivot 24*b*, so that the mirror 50 is tilted horizontally outward.

As described above, in the power mirror system 30 of the present embodiment, when the horizontal angle control switch is kept turned on, the mirror 50 is kept tilted horizontally, i.e., is kept swung horizontally. Thus, the operator can turn off the horizontal angle control switch when the mirror 50 is tilted to a desired horizontal angle, so that the mirror 50 is adjusted to the desired horizontal tilt angle.

The present embodiment provide the following advantages.

(I) In the power mirror system 30 of the present embodiment, one of the reciprocable members 16*a*, 16*b* of the mirror angle control apparatus 10 can be selectively moved forward and backward depending on the rotational direction of the motor 12. Thus, unlike the prior art, it is not required to provide the two motors to the two reciprocable members, respectively, to move the reciprocable members forward and backward. Thus, the number of components can be advantageously reduced to reduce the size and weight of the entire system, thereby allowing a reduction in the manufacturing costs.

(II) The primary gears 14*a*, 14*b* are arranged on the opposite sides of the worm gear 13 and are meshed with the worm gear 13. Each of the one-way clutch mechanisms is arranged between the corresponding secondary gear 15*a*, 15*b* and the corresponding slide support 22*a*, 22*b* and transmits the rotational force of the secondary gear 15*a*, 15*b*, which is rotated in one direction, to the corresponding slide support 22*a*, 22*b*. Since the mirror angle control apparatus 10 of the present embodiment includes such primary gears 14*a*, 14*b* and one-way clutch mechanisms, one of the two slide supports 22*a*, 22*b* can be selectively rotated by simply changing the rotational direction of the motor 12.

(III) Each reciprocable member 16*a*, 16*b* includes the endless helical groove 25, which has the two helical groove sections 25*a*, 25*b*, which extend in opposite helical directions, respectively, and are connected one another at the opposite ends of the reciprocable member 16*a*, 16*b*. Because of the endless helical groove 25, the reciprocable members 16*a*, 16*b* can be reciprocated only by the single directional rotation of the corresponding slide supports 22*a*, 22*b*.

The above embodiment can be modified as follows.

(a) In the above embodiment, the endless helical groove 25 is formed in each reciprocable member 16*a*, 16*b*, and the slide piece 26 is rotatably held by the slide support 22*a*, 22*b*, which serves as the rotatable member. Each reciprocable member 16*a*, 16*b* is slidably engaged with the corresponding slide support 22*a*, 22*b* through the engagement between the endless helical groove 25 of the reciprocable member 16*a*, 16*b* and the slide piece 26 of the slide support 22*a*, 22*b*. However, the present invention is not limited to this arrangement.

Figure 8A:
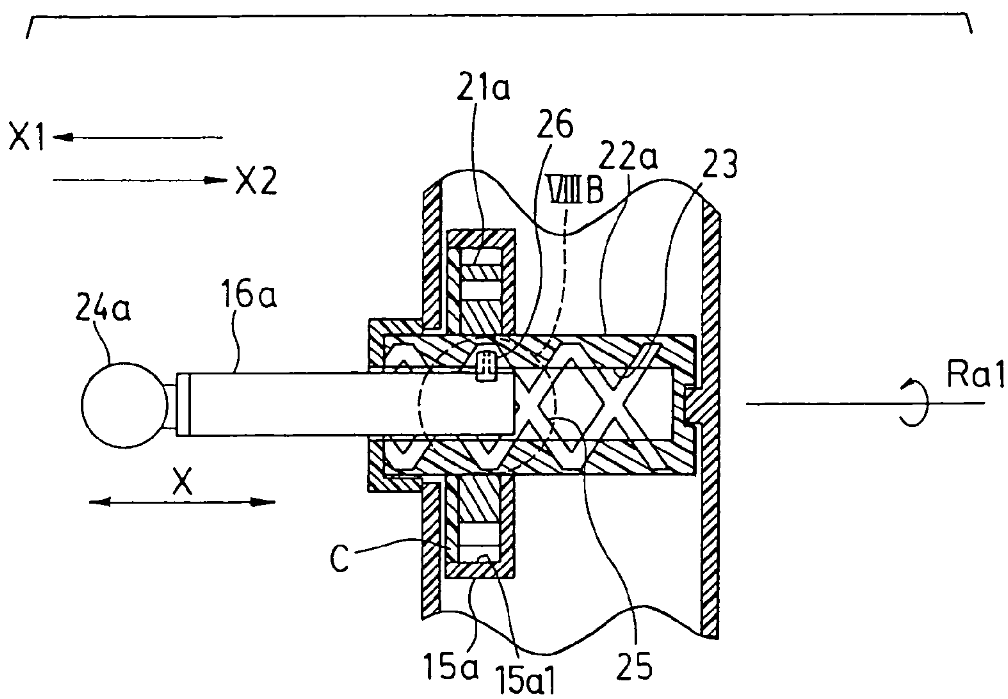
FIG. 8A is a schematic partial view showing a modification of the mirror angle control apparatus of the embodiment.
Figure 8B:
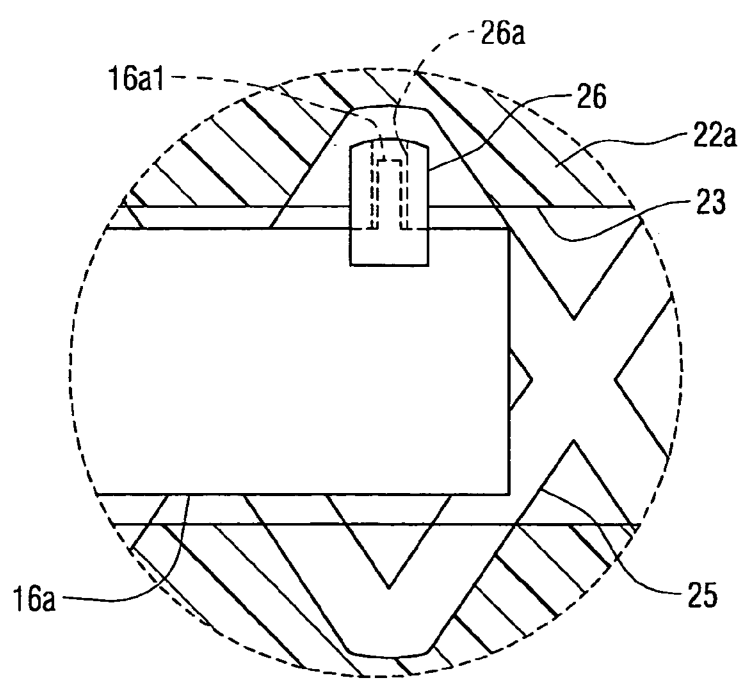
FIG. 8B is a partial enlarged view of a region enclosed in a circle VIIIB in FIG. 8A.

For example, as shown in FIGS. 8A and 8B, the endless helical groove 25 can be formed in an inner peripheral surface of the corresponding slide support 22*a*. The slide piece 26, which is engaged with the endless helical groove 25 can be rotatably held by the corresponding reciprocable member 16*a* around a pin 16*a*1, which extends from an outer peripheral surface of the reciprocable member 16*a* in a direction generally perpendicular to a reciprocating direction of the reciprocable member 16*a*.

(b) In the above embodiment, a groove pitch of the endless helical groove is generally constant. However, the present invention is not limited to this.

Figure 9:
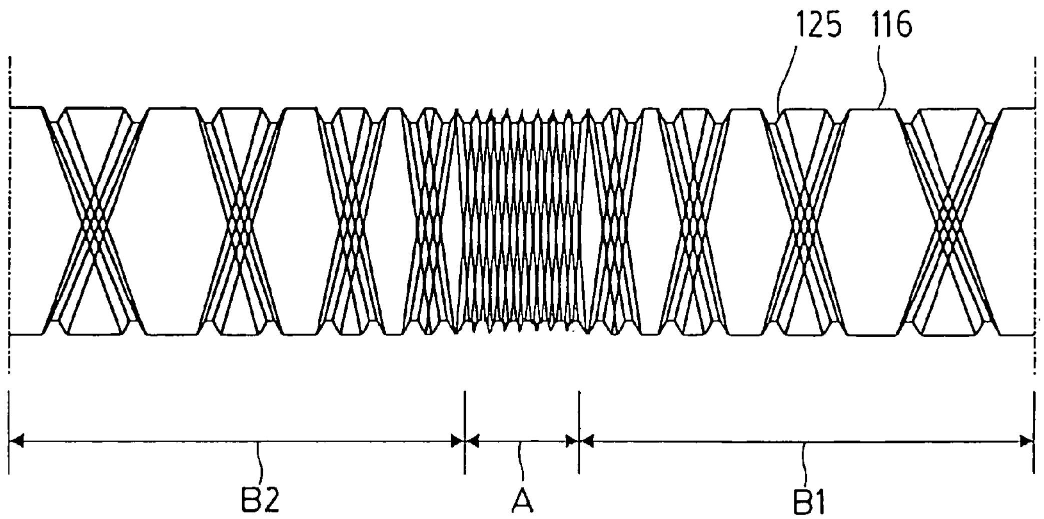
FIG. 9 is a schematic partial enlarged view showing a modification of the reciprocable member of the embodiment.

For example, as shown in FIG. 9, in place of the endless helical groove 25 of the reciprocable member 16*a*, 16*b*, an endless helical groove 125 of a reciprocable member 116 can be used. The endless helical groove 125 has a first type region A and two second type regions B1, B2. The first type region A is provided in the center of the reciprocable member 116 and has a relatively small groove pitch. The second type regions B1, B2 are arranged on opposite sides of the first type region A and have a relatively large groove pitch, which is larger than the groove pitch of the first type region A.

With this arrangement, when the tilt angle of the mirror 50 in the horizontal direction or in the vertical direction is relatively large (i.e., when it is not required to perform small angular adjustment of the mirror 50), the mirror 50 can be rapidly tilted.

(c) In the mirror angle control apparatus 10 of the above embodiment, the motor 12 is rotated at the constant speed. However, the present invention is not limited to this. For example, the rotational speed of the motor 12 can be varied by increasing or decreasing the voltage applied to the motor 12.

(d) In the mirror angle control apparatus 10 of the present embodiment, each secondary gear 15*a*, 15*b* is connected to the worm gear 13 through the corresponding primary gear 14*a*, 14*b*. However, the present invention is not limited to this. For example, each secondary gear 15*a*, 15*b* can be directly meshed with the worm gear 13.

(e) In the mirror angle control apparatus 10 of the present embodiment, each secondary gear 15*a*, 15*b* receives rotational force of the motor 12 through the corresponding primary gear 14*a*, 14*b* and the worm gear 13. However, the present invention is not limited to this. For example, each secondary gear 15*a*, 15*b* can receive the rotational force of the motor 12 through, for example, a belt or a chain.

Additional advantages and modifications will readily occur to those skilled in the art. The invention in its broader terms is therefore not limited to the described illustrative examples.

What is claimed is:

1. A mirror angle control apparatus, for a power mirror system that includes a mirror, the mirror angle control apparatus comprising:

a single electric motor; and first and second reciprocable members that are arranged between the motor and the mirror and are selectively reciprocated by rotational force conducted from the motor to tilt the mirror;

first and second rotatable members that are rotatable relative to and are slidably engaged with the first and second reciprocable members, respectively; and a switchable type transmission mechanism that is arranged between the motor and the first and second rotatable members, wherein:

when the motor is rotated in a first rotational direction, the second reciprocable member is held stationary, and the first reciprocable member is reciprocated to tilt the mirror in a vertical direction;

when the motor is rotated in a second rotational direction, which is opposite from the first rotational direction of the motor, the first reciprocable member is held stationary, and the second reciprocable member is reciprocated to tilt the mirror in a horizontal direction, wherein:

one of the first reciprocable member and the first rotatable member has a first endless helical groove, which includes two helical groove sections that extend in opposite helical directions, respectively, and are connected to one another to form an endless path, and the other one of the first reciprocable member and the first rotatable member has a first slide piece, which is slidably received in the first endless helical groove;

one of the second reciprocable member and the second rotatable member has a second endless helical groove, which includes two helical groove sections that extend in opposite helical directions, respectively, and are connected to one another to form an endless path, and the other one of the second reciprocable member and the second rotatable member has a second slide piece, which is slidably received in the second endless helical groove;

when the motor is rotated in the first rotational direction, the switchable type transmission mechanism transmits rotational force of the motor to the first reciprocable member through the first rotatable member and prevents transmission of the rotational force of the motor to the second reciprocable member through the second rotatable member; and when the motor is rotated in the second rotational direction, the switchable type transmission mechanism transmits rotational force of the motor to the second reciprocable member through the second rotatable member and prevents transmission of the rotational force of the motor to the first reciprocable member through the first rotatable member;

wherein the switchable type transmission mechanism includes:

a worm gear that is connected to the motor and is rotated by the rotational force of the motor;

a first one-way clutch mechanism that is placed between the worm gear and the first rotatable member, wherein the first one-way clutch mechanism conducts the rotational force from the worm gear to the first rotatable member and to the first reciprocable member upon rotation of the motor in the first rotational direction and prevents conduction of the rotational force from the worm gear to the first rotatable member and to the first reciprocable member upon rotation of the motor in the second rotational direction; and a second one-way clutch mechanism that is placed between the worm gear and the second rotatable member, wherein the second one-way clutch mechanism conducts the rotational force from the worm gear to the second rotatable member and to the second reciprocable member upon rotation of the motor in the second rotational direction and prevents conduction of the rotational force from the worm gear to the second rotatable member and to the second reciprocable member upon rotation of the motor in the first rotational direction;

wherein the switchable type transmission mechanism further includes:

a first speed reducing gear arrangement that is arranged on a first side of the worm gear, wherein the first speed reducing gear arrangement is meshed with the worm gear and is connected to the first one-way clutch mechanism to reduce a rotational speed transmitted from the worm gear to the first one-way clutch mechanism in comparison to a rotational speed of the worm gear; and a second speed reducing gear arrangement that is arranged on a second side of the worm gear, which is opposite from the first side of the worm gear, wherein the second speed reducing gear arrangement is meshed with the worm gear and is connected to the second one-way clutch mechanism to reduce a rotational speed transmitted from the worm gear to the second one-way clutch mechanism in comparison to the rotational speed of the worm gear.

2. The mirror angle control apparatus according to claim 1, wherein:

the first reciprocable member is connected to the mirror through a first universal joint assembly; and the second reciprocable member is connected to the mirror through a second universal joint assembly.

3. The mirror angle control apparatus according to claim 1, wherein:

a central axis of the first reciprocable member and a central axis of the second reciprocable member are generally parallel to one another;

the central axis of the first reciprocable member intersects a vertical imaginary line, which extends vertically through a center of the mirror, at a location spaced away from the center of the mirror; and the central axis of the second reciprocable member intersects a horizontal imaginary line, which extends horizontally through the center of the mirror, at a location spaced away from the center of the mirror.

4. The mirror angle control apparatus according to claim 3, wherein each of the central axis of the first reciprocable member and the central axis of the second reciprocable member is generally perpendicular to a corresponding imaginary line that is parallel to a rotational axis of the motor.

5. The mirror angle control apparatus according to claim 1, wherein:

each of the first and second rotatable members is formed into a cylindrical body that has a cylindrical blind hole, which is opened in one end of the rotatable member;

each of the first and second reciprocable members is formed into a cylindrical body that has an outer diameter smaller than an inner diameter of the cylindrical blind hole of the corresponding rotatable member and is reciprocably received in the cylindrical blind hole of the corresponding rotatable member;

the first endless helical groove is formed in one of an inner peripheral surface of the first rotatable member and an outer peripheral surface of the first reciprocable member;

the first slide piece is rotatably arranged in the other one of the inner peripheral surface of the first rotatable member and the outer peripheral surface of the first reciprocable member, wherein a rotational axis of the first slide piece extends in a direction generally perpendicular to a reciprocating direction of the first reciprocable member;

the second endless helical groove is formed in one of an inner peripheral surface of the second rotatable member and an outer peripheral surface of the second reciprocable member; and the second slide piece is rotatably arranged in the other one of the inner peripheral surface of the second rotatable member and the outer peripheral surface of the second reciprocable member, wherein a rotational axis of the second slide piece extends in a direction generally perpendicular to a reciprocating direction of the second reciprocable member.

6. The mirror angle control apparatus according to claim 1, wherein:

the first speed reducing gear arrangement includes:

a first primary gear that is meshed with the worm gear;

a first intermediate gear that is coaxially secured to the center of the first primary gear; and a first secondary gear that is meshed with the first intermediate gear and has a recess in a center of the first secondary gear;

the first one-way clutch mechanism includes:

a first clutch plate that is received in the recess of the first secondary gear and is secured to the first rotatable member to rotate integrally with the first rotatable member, wherein the first clutch plate includes at least one driven-side engaging portion; and at least one driving-side engaging portion securely provided in an inner peripheral wall of the recess of the first secondary gear, wherein:

when the motor is rotated in the first rotational direction, the rotational force of the motor is transmitted to the first secondary gear through the worm gear, the first primary gear and the first intermediate gear to rotate the first secondary gear in a first rotational direction, so that the at least one driving-side engaging portion of the first secondary gear is engaged with the at least one driven-side engaging portion of the first clutch plate to rotate the first clutch plate and the first rotatable member and thereby to reciprocate the first reciprocable member; and when the motor is rotated in the second rotational direction, the rotational force of the motor is transmitted to the first secondary gear through the worm gear, the first primary gear and the first intermediate gear to rotate the first secondary gear in a second rotational direction, which is opposite from the first rotational direction of the first secondary gear, so that the at least one driving-side engaging portion of the first secondary gear is disengaged from the at least one driven-side engaging portion of the first clutch plate, and the first secondary gear is rotated relative to the first clutch plate without rotating the first clutch plate;

the second speed reducing gear arrangement includes:

a second primary gear that is meshed with the worm gear;

a second intermediate gear that is coaxially secured to the center of the second primary gear; and a second secondary gear that is meshed with the second intermediate gear and has a recess in a center of the second secondary gear;

the second one-way clutch mechanism includes:

a second clutch plate that is received in the recess of the second secondary gear and is secured to the second rotatable member to rotate integrally with the second rotatable member, wherein the second clutch plate includes at least one driven-side engaging portion; and at least one driving-side engaging portion securely provided in an inner peripheral wall of the recess of the second secondary gear, wherein:

when the motor is rotated in the second rotational direction, the rotational force of the motor is transmitted to the second secondary gear through the worm gear, the second primary gear and the second intermediate gear to rotate the second secondary gear in a first rotational direction, so that the at least one driving-side engaging portion of the second secondary gear is engaged with the at least one driven-side engaging portion of the second clutch plate to rotate the second clutch plate and the second rotatable member and thereby to reciprocate the second reciprocable member; and when the motor is rotated in the first rotational direction, the rotational force of the motor is transmitted to the second secondary gear through the worm gear, the second primary gear and the second intermediate gear to rotate the second secondary gear in a second rotational direction, which is opposite from the first rotational direction of the second secondary gear, so that the at least one driving-side engaging portion of the second secondary gear is disengaged from the at least one driven-side engaging portion of the second clutch plate, and the second secondary gear is rotated relative to the second clutch plate without rotating the second clutch plate.

* * * * *